(12) United States Patent
Piazza et al.

(10) Patent No.: US 6,784,392 B1
(45) Date of Patent: Aug. 31, 2004

(54) GAS-INSULATED SWITCHGEAR DEVICE

(75) Inventors: Costante Piazza, Lodi (IT); Libero Sfondrini, Lodi (IT); Aldo Sciacca, San Donato Milanese (IT)

(73) Assignee: ABB Service S.r.l., Milan (IT)

( * ) Notice: Subject to any disclaimer, the term of this patent is extended or adjusted under 35 U.S.C. 154(b) by 0 days.

(21) Appl. No.: 10/070,749

(22) PCT Filed: Sep. 4, 2000

(86) PCT No.: PCT/EP00/08842
§ 371 (c)(1),
(2), (4) Date: Mar. 11, 2002

(87) PCT Pub. No.: WO01/20736
PCT Pub. Date: Mar. 22, 2001

(30) Foreign Application Priority Data

Sep. 15, 1999 (IT) .......................................... MI99A1923

(51) Int. Cl.[7] .............................................. H01H 33/14
(52) U.S. Cl. .............................. 218/7; 218/14; 218/154
(58) Field of Search ........................... 218/2, 7, 12, 14, 218/32, 43, 78, 84, 92, 154, 120, 153, 48–50, 55, 65, 79, 80, 45, 108, 146

(56) References Cited

U.S. PATENT DOCUMENTS

| | | | | |
|---|---|---|---|---|
| 3,626,126 A | * | 12/1971 | Pesch ........................... | 218/17 |
| 4,109,124 A | * | 8/1978 | Boersma et al. ............... | 218/77 |
| 4,300,028 A | * | 11/1981 | Cronin et al. ................ | 200/252 |
| 4,659,886 A | * | 4/1987 | Olsen et al. ................... | 218/45 |
| 5,796,060 A | * | 8/1998 | Fuchsle et al. ............... | 218/79 |
| 6,271,493 B1 | * | 8/2001 | Ponsioen ...................... | 218/22 |
| 6,545,241 B1 | * | 4/2003 | Franchi et al. ................ | 218/78 |
| 6,573,469 B1 | * | 6/2003 | Piazza ........................... | 218/7 |

FOREIGN PATENT DOCUMENTS

WO       WO-200120736 A  *  3/2002

* cited by examiner

*Primary Examiner*—Lincoln Donovan
*Assistant Examiner*—M. Fishman
(74) *Attorney, Agent, or Firm*—Guido Modiano; Albert Josif; Daniel O'Byrne

(57) ABSTRACT

A gas-insulated switchgear device which has a first bushing which accommodates a first terminal, a second bushing which accommodates a second terminal, a first enclosure which contains an interruption unit, and at least one first disconnection unit which has a first fixed contact electrically connected to the interruption unit and a second fixed contact at ground voltage, a first moving contact which is electrically connected to the first terminal and can be coupled to the first and second fixed contacts, the moving contact being fixed to a rotary operating element and rotating rigidly therewith, the fixed contacts that can be coupled to the moving contact lying on the rotation plane of the moving contact.

16 Claims, 5 Drawing Sheets

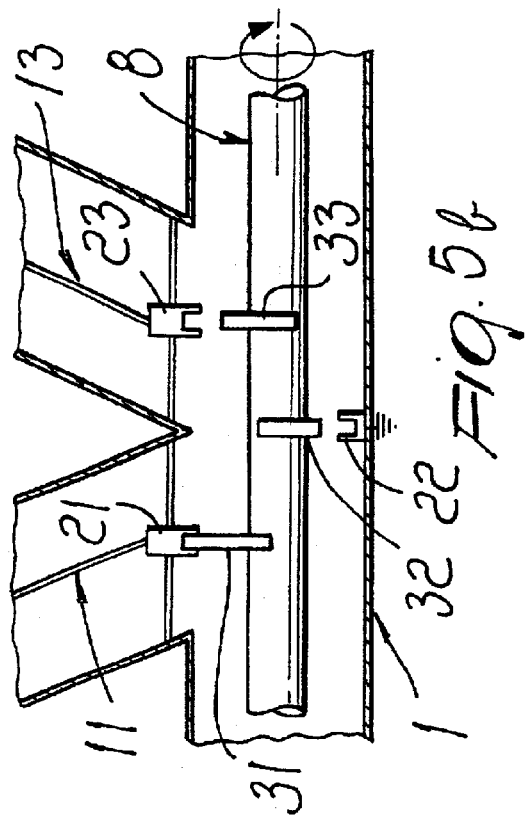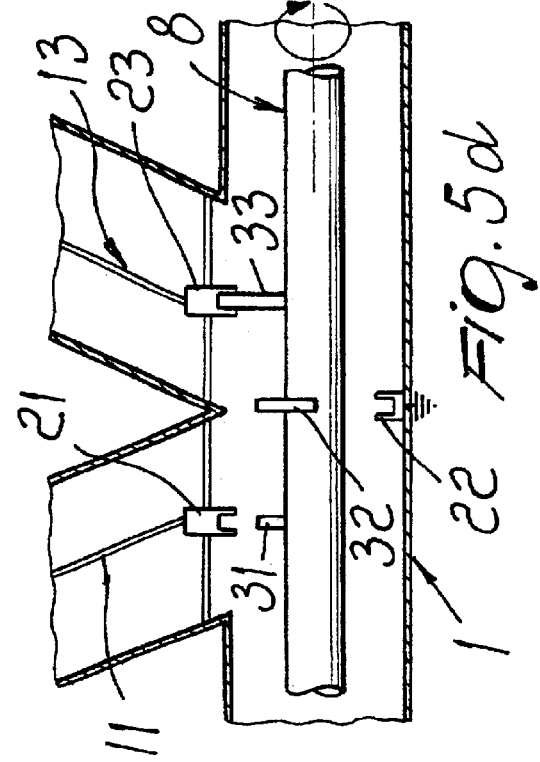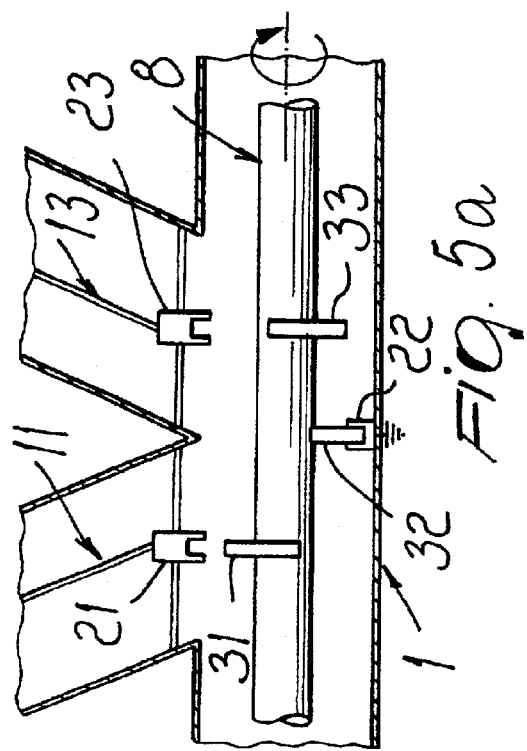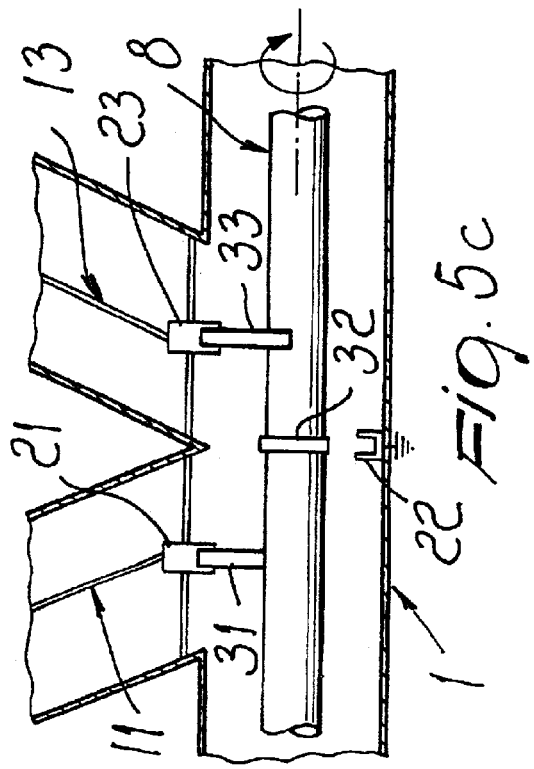

GAS-INSULATED SWITCHGEAR DEVICE

BACKGROUND OF THE INVENTION

The present invention relates to a gas-insulated switchgear device for high- and medium-voltage applications, i.e. for voltages greater than 1000 Volt, having improved functions and characteristics. In particular, the device according to the invention, by virtue of its innovative structure, allows to optimize execution of the required electric switching, according to a solution which is at the same time simple, effective and compact.

It is known from the art that electric switching operations, for both interruption and disconnection, in gas-insulated circuit breaker and disconnector units are provided by virtue of the translatory motion of one or more moving contacts which can couple/uncouple with respect to corresponding fixed contacts. A significant drawback of known types of devices is the fact that the various switching operations, for example for disconnection on the input line or on the output line, are performed by means of dedicated components which are structurally separate and mutually distinct; in this way, the number of components used to implement the various switching operations is large and entails an increase in the space occupation and total volume of the device, with a consequent cost increase.

Furthermore, the necessary switching operations are performed by using actuation devices which comprise actuators of the mechanical or hydraulic type which are mechanically connected to a moving contact to be moved by virtue of appropriate operating elements.

The actuation devices of the known art generally require complicated kinematic systems to transmit motion to the moving contact. In particular, the switching operation for disconnection requires the coordinated movement of one or more moving contacts, so that the opening/closure of the disconnection contacts occurs in the intended sequence. This usually entails complicated coupling mechanisms and/or complicated actuation and control systems, especially when disconnection occurs on multiple-bar systems.

In view of the mechanical complexity of the movement elements, maintenance interventions are necessary in order to maintain nominal behavior and therefore ensure repeatability of the movement, compensating for the variations caused by wear and aging of the system.

SUMMARY OF THE INVENTION

The aim of the present invention is to provide a gas-insulated switchgear device in which the electrical switching operations, particularly for disconnection, occur in a simple and easily controllable way.

Within the scope of this aim, an object of the present invention is to provide a gas-insulated switchgear device which has reduced mechanical complexity and a simplified structure with respect to the devices of the known art.

Another object of the present invention is to provide a gas-insulated switchgear device in which the switching operation for disconnection occurs by using and moving a reduced number of mechanical parts.

Another object of the present invention is to provide a gas-insulated switchgear device which has reduced dimensions and space occupation.

Another object of the present invention is to provide a gas-insulated switchgear device which is highly reliable, relatively easy to provide and at competitive costs.

This aim, these objects and others which will become apparent hereinafter are achieved by a gas-insulated switchgear device, having a first bushing which accommodates a first terminal and a second bushing which accommodates a second terminal, a first enclosure which contains an interruption unit, characterized in that it comprises at least one first disconnection unit which has a first fixed contact which is electrically connected to said interruption unit and a second fixed contact at ground voltage, a first moving contact which is electrically connected to the first terminal and can be coupled to said first and second fixed contacts, said moving contact being fixed to a rotary operating element and rotating rigidly therewith, and in that the fixed contacts that can be coupled to said first moving contact lie on the rotation plane of said moving contact.

The device according to the invention can be of the segregated-phase or joined-phase type, for a single-bar or multiple-bar system, with single-pole or three-pole actuation.

In the device according to the invention, the disconnection maneuver therefore occurs by rotation of the moving contact about a rotation axis. By virtue of the rotation, the moving contact, which in practice constitutes a rotating extension of the first terminal, couples/uncouples with respect to one of the two corresponding fixed contacts, performing the switching for disconnection and grounding of the first terminal, or maintaining electrical continuity. The moving contact can furthermore assume an intermediate position for simply disconnecting the first terminal without grounding it. For these purposes, the moving contact and the fixed contacts are arranged in such a mutual position that the ends of the fixed contacts that must engage the end of the moving contact lie on the rotation plane traced by said end of the moving contact. For the sake of simplicity, when reference is made in the present invention to the relative position of the fixed contacts and of the moving contact, reference is always intended to the relative position of the ends of the fixed contacts and of the moving contact that can be coupled thereto.

By appropriately dimensioning the position of the fixed contacts and of the moving contact it is possible to minimize the volume and the space required by the disconnection unit and therefore by the entire device, maintaining easy execution of switching for disconnection.

Another advantage of the device according to the invention is the fact that it constitutes, in practice, a prefabricated module which can be easily transported to the installation site.

BRIEF DESCRIPTION OF THE DRAWINGS

Further characteristics and advantages will become apparent from the description of some preferred but not exclusive embodiments of a switchgear device according to the invention, illustrated only by way of non-limitative example in the accompanying drawings, wherein:

FIGS. 5a–5d are schematic views of some output disconnection switching operations which can be performed with the device of FIG. 2.

DESCRIPTION OF THE PREFERRED EMBODIMENTS

Figure 1:
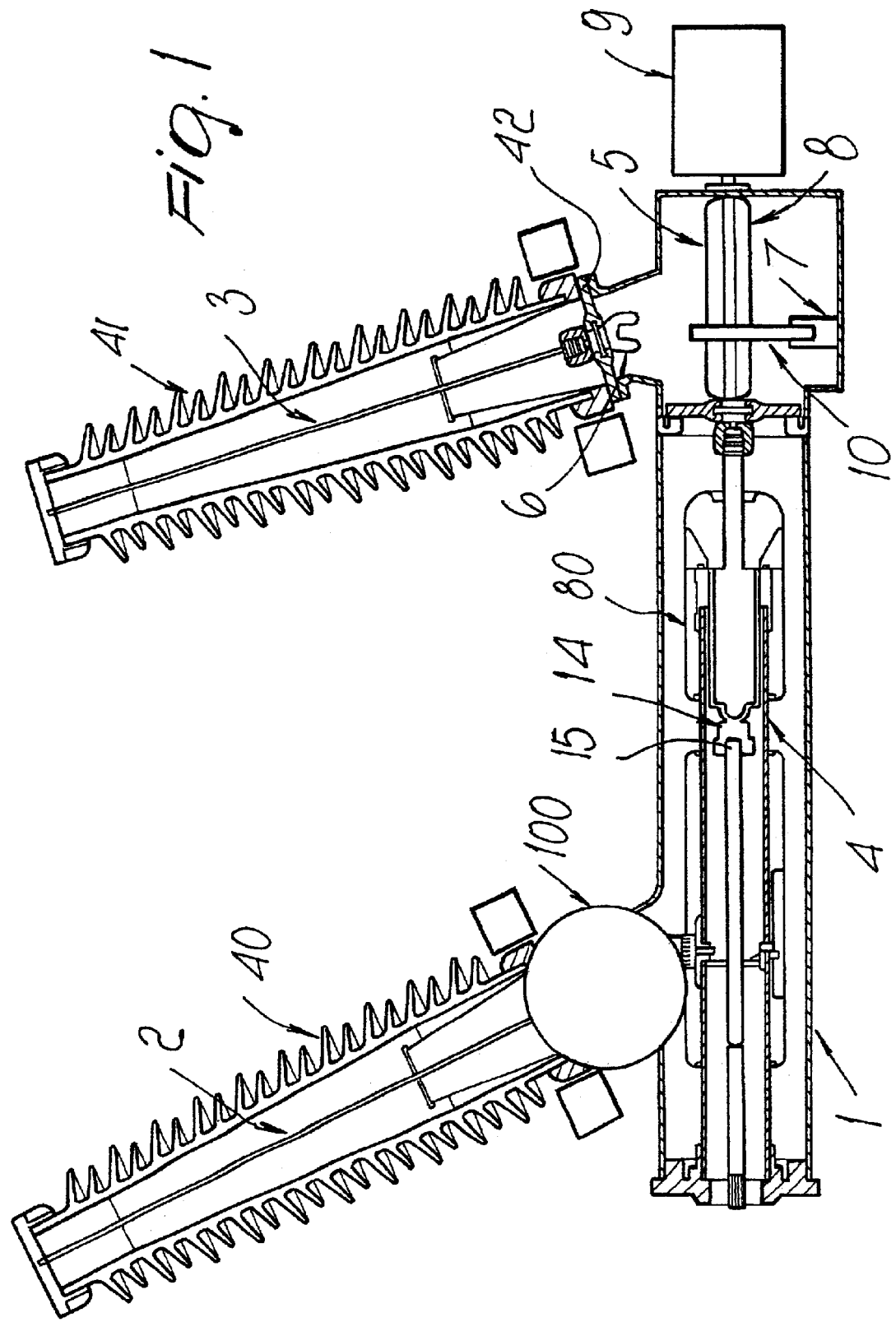
FIG. 1 is a sectional view of an embodiment of a gas-insulated switchgear device for a single-bar system with single-pole actuation, according to the invention.

With reference to FIG. 1, the device according to the invention comprises an enclosure 1 which contains an interruption unit 4 and an insulating gas, a first bushing 40 which accommodates a first electrical terminal 2, and a second bushing 41 which accommodates a second electrical terminal 3; the second bushing 41 is structurally connected to the enclosure 1 by means of a flange 42.

For example, the terminals 2 and 3 can be connected to a power line in input to and output from the switchgear device, respectively; alternatively, they can be connected to other electrical devices according to the applications.

Figure 3:
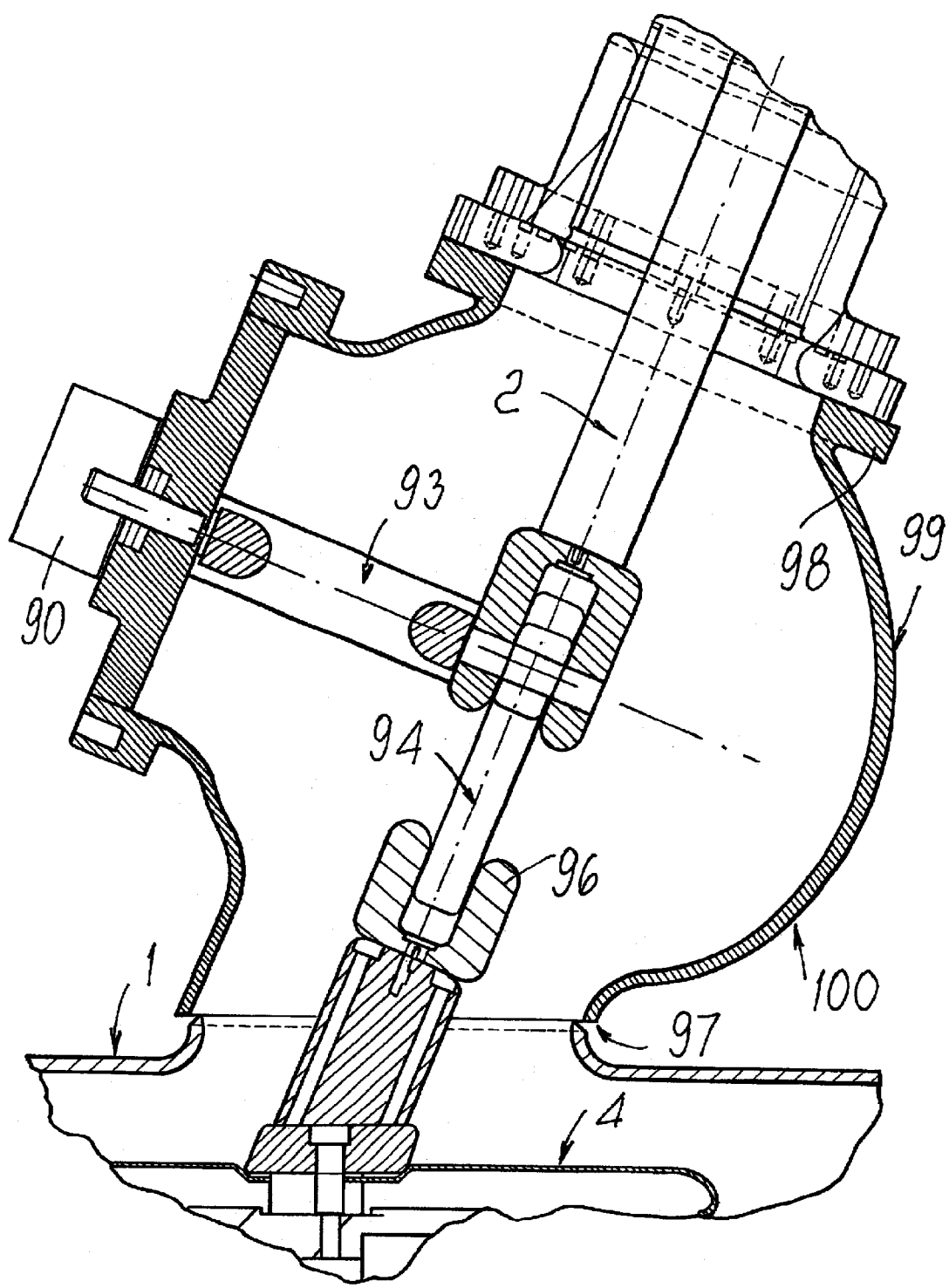
FIG. 3 is a detail view of a disconnection unit which can be used to disconnect the input line in the devices of FIGS. 1 and 2.

In the device according to the invention, a first disconnection unit 100 is used between the input bushing 40 and the enclosure 1, at the base of the bushing 40 itself. As shown in detail in FIGS. 3 and 4, the disconnection unit 100 comprises an enclosure 99 which has a substantially spheroidal central portion and two mutually opposite ends 97 and 98 which are structurally connected to the enclosure 1 and to the first bushing 40, respectively. Said disconnection unit 100 furthermore comprises a first fixed contact 96, which is electrically connected to the interruption unit 4, a second fixed contact 95 at ground voltage, which is arranged on the spherical enclosure 99, and a first moving contact 94. The moving contact 94, which is electrically connected to the input terminal 2, is fixed to a rotary operating element 93 and rotates rigidly therewith. In particular, the rotary operating element 93 is constituted by a shaft 93 which is made of insulating material and is moved by actuation elements, for example an appropriately controlled electric motor, schematically designated by the reference numeral 90 in FIG. 3. Advantageously, the insulating shaft 93 has an end which is connected to the input terminal 2 and acts as structural support for said terminal 2, allowing to avoid the use of additional supporting elements.

In a preferred embodiment, and according to a solution which is structurally and functionally simple and effective, the moving contact 94 is constituted by a blade which is keyed on the insulating shaft 93 and is arranged substantially at right angles to the rotation axis of said shaft; furthermore, the moving contact 94, the first fixed contact 96 and the second fixed contact 95 are arranged so that the ends of said fixed contacts lie on the plane traced by the rotation of the end of the moving contact 94. In normal operating conditions, the moving contact 94 is coupled to the fixed contact 96 so as to determine electrical continuity between the input terminal 2 and the interruption unit 4. Switching for disconnection and grounding of the input terminal 2 occurs by turning the shaft 93; accordingly, the moving contact 94 rigidly coupled thereto couples to the fixed contact 95, thus providing the ground connection. In this manner, the switching operation is simple, with a limited number of components involved, and occurs according to an extremely compact constructive solution.

Another advantage of this solution consists of the fact that the disconnection unit 100, being arranged inside a containment enclosure, is in a position in which it is protected against atmospheric agents, thus allowing to reduce the necessary maintenance interventions; furthermore, the substantially spheroidal shape of the enclosure 99 allows to optimize the distribution of the electric field inside said disconnection unit 100, without requiring cumbersome constructive elements.

Figure 4:
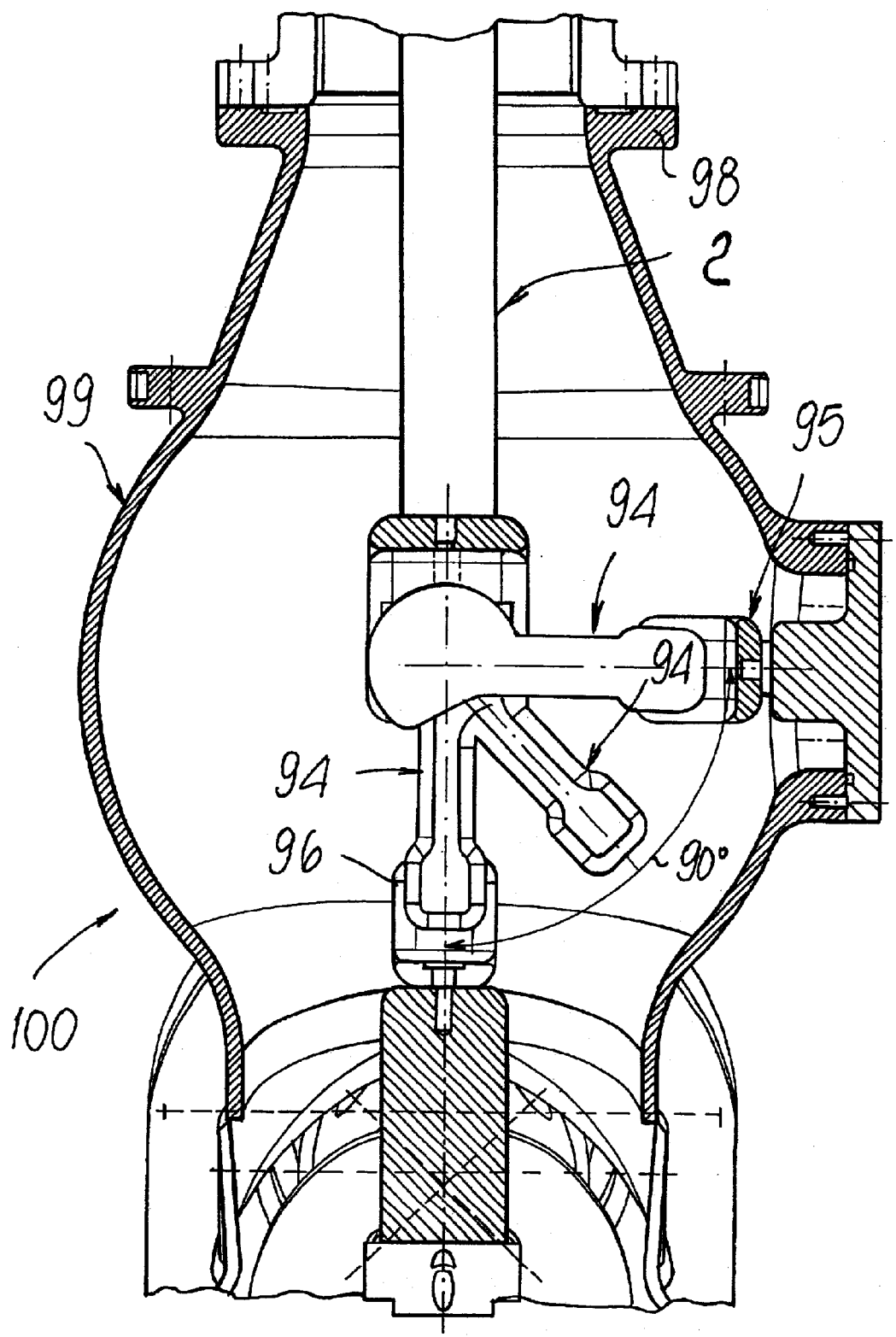
FIG. 4 is a schematic view of the disconnection unit of FIG. 3 during the disconnection and grounding maneuver of the input line.

The rotation angle of the moving contact 94 between the position in which it is coupled to the fixed contact 96 and the position in which it is coupled to the fixed contact 95 can be between 30° and 150°, preferably between 60° and 120°, more preferably between 80° and 100°; in particular, as shown in FIG. 4, said rotation angle is approximately 90°. It is furthermore possible to arrange the moving contact 94 in an intermediate position in which it is coupled neither to the fixed contact 95 nor to the fixed contact 96, performing disconnection of the input terminal 2 without connecting it to the ground.

Advantageously, according to a preferred embodiment, the device according to the invention is provided with a second disconnection unit 5 which is positioned inside the enclosure 1 and is electrically connected to the interruption unit 4; as illustrated, the disconnection unit 5 is positioned on the opposite side of the interruption unit 4 with respect to the first disconnection unit 100. The second disconnection unit 5 comprises a third fixed contact 6 which is connected to the output terminal 3 and a fourth fixed contact 7 at ground voltage. In the case of FIG. 1, the fixed contact 7 is connected to the enclosure 1 which is at ground voltage. The disconnection unit 5 comprises a second operating element, preferably a rotating shaft 8, which is moved by actuation elements represented schematically by the device 9, which can be for example an appropriately controlled electric motor.

A second moving contact 10, electrically connected to the interruption unit 4, is fixed to the shaft 8 and rotates rigidly with it. In the embodiment of FIG. 1, the second moving contact 10 is constituted by a blade which has a circular sector-shaped profile and is keyed on the shaft 8. The moving contact 10 and the third and fourth fixed contacts 6 and 7 are arranged so that the ends of said fixed contacts lie on the plane traced by the rotation of the end of the moving contact 10. In this case, the disconnection operation occurs by turning the shaft 8; accordingly, the moving contact 10 rigidly coupled thereto couples to the fixed contact 6 or 7, thus providing the line or ground connection of the output terminal 3, respectively. In FIG. 1, the moving contact 10 is coupled to the fixed contact 7; the ground connection is therefore closed, while the output connection is open.

According to an alternative embodiment, not shown in the figure, it is possible to have two moving contacts which are fixed to the shaft 8, each being able to couple to a corresponding fixed contact. In this case, the fixed contact 6 lies on the rotation plane of one of the two moving contacts that can be coupled thereto, while the fixed contact 7 lies on the rotation plane of the other moving contact that can be coupled thereto. Furthermore, the two moving contacts are fixed to the shaft 8 in a relative angular position by virtue of which they cannot be simultaneously coupled to the fixed contacts 6 and 7. In this manner, by virtue of the rotation of the shaft 8, one obtains for example uncoupling between the fixed contact 6 and the first moving contact, followed by coupling between the fixed contact 7 and the second moving contact, thus providing ground disconnection. It is possible to proceed in the same manner when one wishes to open the ground disconnection contact and close the line contact.

A gas-insulated switchgear device for a two-bar system is now described with reference to FIG. 2. As previously described, the device of FIG. 2 comprises an enclosure 1 which contains a disconnection unit 5 and an interruption unit 4, and contains an insulating gas, a first bushing 40 which accommodates an input terminal 2, and a second bushing 41 which accommodates a first output terminal 11. Between the bushing 40 and the enclosure 1 there is a disconnection unit 100; the device furthermore comprises a third bushing 43 which accommodates a second output terminal 13. In this case, the disconnection unit 5 comprises a third fixed contact 21 which is connected to the output terminal 11, a fourth fixed contact 22 at ground voltage, and a fifth fixed contact 23 which is connected to the second output terminal 13. As in FIG. 1, the fixed contact 22 is connected to the enclosure 1 which is at ground voltage. The disconnection unit 5 comprises a rotating shaft 8 which is moved by actuation elements which are schematically represented by the device 9, which can be for example an appropriately controlled electric motor.

A second moving contact 31, a third moving contact 32 and a fourth moving contact 33, electrically connected to the interruption unit 4, are fixed to the shaft 8 and rotate rigidly therewith. In the embodiment of FIG. 2, the moving contacts 31, 32 and 33 are constituted by blades which have a circular sector-like profile and are keyed to the shaft 8. The moving contacts 31, 32, 33 and the fixed contacts 21, 22, 23 are arranged so that for each pair of contacts (21, 31), (22, 32) and (23, 33) the fixed contact lies on the rotation plane of the corresponding moving contact. Furthermore, the moving contacts 31, 32 and 33 are fixed to the shaft 8 with such an angular arrangement that the moving contact 32 cannot be coupled to the fixed contact 22 when the moving contact 31 and/or the moving contact 33 are coupled to the corresponding fixed contacts 21 and 23. Switching for disconnection on the output terminal side occurs by turning the shaft 8; accordingly, the moving contacts 31, 32 and 33 rigidly coupled thereto couple to the respective fixed contacts 21, 22 and 23. In FIG. 2, the moving contact 32 is coupled to the fixed contact 22, while the moving contacts 31 and 33 are uncoupled from the respective fixed contacts 21 and 23; the ground connection is therefore closed, while the output connections are open.

The operating principle is shown schematically in FIGS. 5a–5d, in which the moving contacts are constituted by blades which are keyed to the shaft 8.

With reference to FIG. 5a, a situation is shown in which the moving contact 32 is coupled to the corresponding fixed contact 22, while the moving contacts 31 and 33 are uncoupled from the corresponding fixed contacts. By turning the shaft 8 in the direction of the arrow, the ground contact is opened and then the moving contact 31 couples to the fixed contact 21, closing the connection toward the output terminal 11 (FIG. 5b). By again turning the shaft 8 in the same direction, the moving contact 33 couples to the fixed contact 33 before uncoupling occurs between the contacts 21 and 31. In this manner, the connection toward the output terminal 13 is closed while the connection toward the terminal 11 simultaneously remains closed (FIG. 5c). If the rotation of the shaft 8 is continued, it is possible to separate the contact 31 from the contact 21, opening the connection toward the terminal 11 and keeping closed the connection toward the terminal 13 (FIG. 5d). It is furthermore possible to perform a switching operation, not shown, in which all the moving contacts are uncoupled from the corresponding fixed contacts so that the output terminals are disconnected without being grounded.

According to an alternative embodiment, not shown, the second disconnection unit 5 comprises just two moving contacts which are fixed to the shaft 8. The fixed ground contact 22 and one of the other two fixed contacts, for example the fixed contact 21, lie on the rotation plane of said moving contact, which can be coupled alternately to the fixed contact 21 or to the fixed contact 22; the third fixed contact 23 lies on the rotation plane of the other moving contact and can be coupled thereto. The two moving contacts are fixed to the shaft 8 with a mutual angular arrangement by virtue of which they cannot be simultaneously coupled to the contacts 22 and 23, while their relative angular position is such that they can be simultaneously coupled to the fixed contacts 21 and 23.

Figure 2:
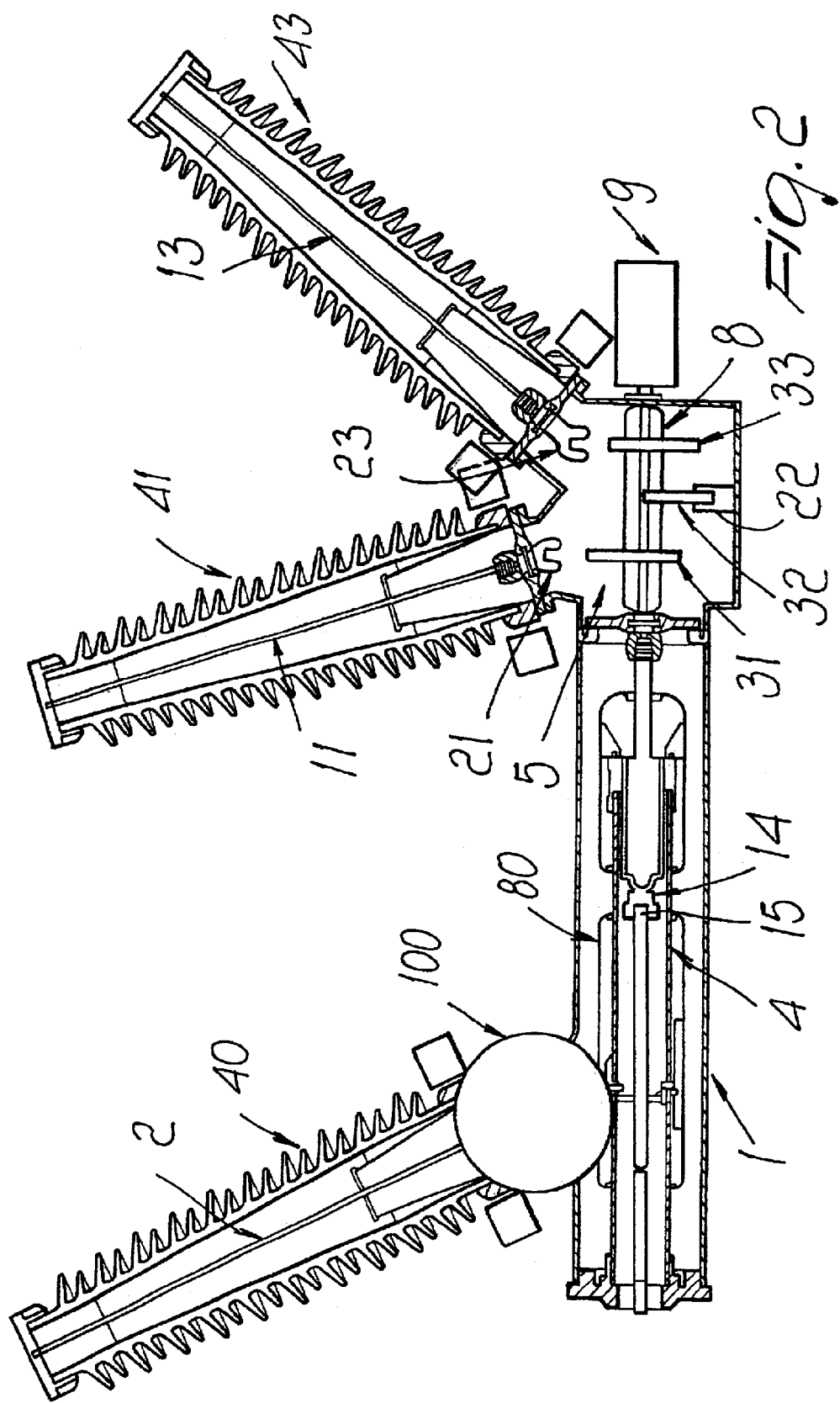
FIG. 2 is a sectional view of an embodiment of a gas-insulated switchgear device for a two-bar system with single-pole actuation according to the invention.

As previously indicated, in both embodiments of FIGS. 1 and 2, the switchgear device according to the invention comprises an interruption unit 4 which has an interruption chamber which accommodates a fixed contact 14 and a moving contact 15, the longitudinal axis of the interruption chamber being substantially aligned with the rotation axis of the second operating element 8. In this case, the opening/closure switching of the interruption unit 4 is performed by means of a translatory motion of the moving contact of the interruption unit along the longitudinal axis of the device, while disconnection on the output terminal side occurs by rotation of the moving contacts of the disconnection unit 5 about said longitudinal axis.

According to a particular embodiment, not shown, the operating element of the disconnection unit 5 is constituted by the enclosure 80 of the interruption chamber. In this case, the moving contacts of the second disconnection unit 5 are keyed to the outer surface of the interruption chamber, which can rotate with respect to the enclosure 1 of the device. The movement is applied by actuation elements, for example an appropriately controlled electric motor. The mutual arrangement of the fixed contacts and of the moving contacts is similar to the one shown in FIGS. 1 or 2, depending on whether a single- or two-bar system is provided. By using this technical solution, the device according to the invention is particularly compact, since the space occupied by the disconnection unit 5 is distributed inside the enclosure 1 along the interruption chamber.

As mentioned, the disconnection elements are moved by virtue of suitable actuation means, preferably constituted by a controlled electric motor. In particular, it has been found that the use of a servomotor, both for the first disconnection unit 100 and for the second disconnection unit 5, as well as for the movement of the moving contacts of the interruption unit 4, allows considerable advantages in terms of switching precision and speed. Alternatively, it is possible to use mechanical or hydraulic actuation means. Manual actuation means can also be provided alternatively, or in addition, to the above described actuation means, particularly to perform emergency manual switching.

The device according to the invention can be of the type with single-pole actuation, in which actuation means are provided on each individual phase in order to perform switching for disconnection; alternatively, it can be of the type with three-pole actuation, in which the energy for switching for disconnection on the three phases of the device is provided by a single actuation means which is mechanically coupled to the disconnection units of each individual phase.

The gas-insulated switchgear device thus conceived is susceptible of numerous modifications and variations, all of which are within the scope of the inventive concept; all the details may furthermore be replaced with technically equivalent elements. In practice, the configurations considered, so long as they are compatible with the specific use, as well as the individual components, may be any according to the requirements and the state of the art.

What is claimed is:

1. A gas-insulated switchgear device, having:
   a first bushing which accommodates a first terminal and a second bushing which accommodates a second terminal;
   a first enclosure which contains an interruption unit; and
   at least one first disconnection unit which has a at fixed contact which is electrically connected to said interruption unit, and a second fixed contact at ground voltage, and a first moving contact which is electrically connected to the first terminal and can be coupled to said first and second fixed contacts, said fit moving contact being fixed to a rotary operating element and rotating rigidly therewith, the first and second fixed contacts lying on the rotation plane of said first moving contact, where said rotary operating element comprises a shaft made of insulating material, said shaft having an end which is connected to the first terminal and being suitable to support it structurally.

2. The switchgear device according to claim 1, wherein sad first disconnection unit comprises an enclosure which has a substantially spheroidal central portion and two mutually opposite ends which are structurally connected respectively to said first enclosure and to said first bushing.

3. The switchgear device according to claim 2, wherein said second fixed contact at ground voltage is arranged on the spheroidal portion.

4. The switchgear device according to claim 1, wherein the first moving contact is constituted by a blade which is keyed on said operating element and is substantially perpendicular to its rotation axis.

5. The switchgear device according to claim 1, said first moving contact can be turned between a first position for coupling to the first fixed contact and a second position for coupling to the second fixed contact, the rotation angle between the first position and the second position being between 30° and 150°, preferably between 60° and 120°, more preferably between 80° and 100°.

6. The switchgear device according to claim 1, comprising a second disconnection unit which is arranged inside said first enclosure and comprises a third fixed contact which is connected to the second terminal and a fourth fixed contact which is at ground voltage, at least one second moving contact which can be coupled to at least one of said third and fourth fixed contacts and is electrically connected to said interruption unit, said second moving contact being fixed to a second rotary operating element and rotating rigidly therewith, the fixed contact that can be coupled to said second moving contact being arranged on the rotation plane of said second moving contact.

7. The switchgear device according to claim 6, wherein said second disconnection unit comprises a single moving contact and wherein said third and fourth fixed contacts lie on the rotation plane of the moving contact.

8. The switchgear device according to claim 6, wherein said second disconnection unit comprises a second moving contact and a third moving contact which are fixed to said second operating element, and wherein said third and fourth fixed contacts lie respectively on the rotation plane of said second and third moving contacts, which are fixed to said second operating element in a relative angular arrangement by virtue of which they cannot be simultaneously coupled respectively to said third and fourth fixed contacts.

9. The switchgear device according to claim 8, further comprising a third bushing which accommodates a third terminal and wherein said second disconnection unit comprises a fifth fixed contact which is connected to said third terminal, a second moving contact and a third moving contact which are fixed to the second operating element, said third and fourth fixed contacts being arranged on the rotation plane of said second moving contact, the fifth fixed contact being arranged on the rotation plane of said third moving contact, the second and third moving contacts being fixed to the second operating element in a mutual angular arrangement by virtue of which they cannot be simultaneously coupled respectively to said fourth and fifth fixed contacts.

10. The switchgear device according to claim 8, comprising a third bushing which accommodates a third terminal, and wherein said second disconnection unit comprises a fifth fixed contact which is connected to said third terminal, a second moving contact, a third moving contact and a fourth moving contact which are fixed to the second operating element, the third, fourth and fifth fixed contacts being arranged respectively on the rotation plane of the second, third and fourth moving contacts, said moving contacts being fixed to the operating element in a mutual angular arrangement by virtue of which the third moving contact cannot be coupled to the fourth fixed contact when the second and/or fourth moving contacts are coupled to the corresponding fixed contacts.

11. The switchgear device according to claim 9, wherein at least one of the moving contacts that belong to the second disconnection unit is constituted by a blade which is keyed on the second operating element and is substantially perpendicular to the rotation axis of said second operating element.

12. The switchgear device according to claim 6, wherein the interruption unit comprises an interruption chamber which accommodates a fixed contact and a moving contact, the longitudinal axis of said chamber being substantially aligned with the rotation axis of the second operating element.

13. The switchgear device according to claim 12, wherein the enclosure of said interruption chamber constitutes the second operating element.

14. The switchgear device according to claim 6, wherein the rotary operating element of the first (and/or) and the second disconnection units is actuated by an electric rotary servomotor.

15. The switchgear device according to claim 6, wherein only the rotary operating element of the first disconnection unit is actuated by an electric rotary servomotor.

16. The switchgear device according to claim 6, wherein only the rotary operating element of the second disconnection unit is actuated by an electric rotary servomotor.

* * * * *